United States Patent [19]
Handa et al.

[11] Patent Number: 5,775,457
[45] Date of Patent: Jul. 7, 1998

[54] FINAL DRIVE ASSEMBLY FOR AN ALL-TERRAIN VEHICLE

[75] Inventors: Akio Handa; Bunzo Seki, both of Saitama, Japan

[73] Assignee: Honda Giken Kabushika Kaisha, Tokyo, Japan

[21] Appl. No.: 682,950

[22] Filed: Jul. 16, 1996

Related U.S. Application Data

[60] Provisional application No. 60/009,307 Dec. 28, 1995.

[51] Int. Cl.⁶ .................................................. B60K 17/00
[52] U.S. Cl. ........................ 180/344; 180/215; 180/370
[58] Field of Search ............................. 180/215, 344, 180/370, 62, 226, 905; 188/18 R

[56] References Cited

U.S. PATENT DOCUMENTS

| | | | |
|---|---|---|---|
| 4,448,279 | 5/1984 | Watanabe et al. | 180/215 |
| 4,534,440 | 8/1985 | Sekizaki et al. | 180/215 |
| 4,593,782 | 6/1986 | Nobusawa et al. | 180/215 |
| 4,667,760 | 5/1987 | Takimoto | 180/215 |
| 4,730,689 | 3/1988 | Takashashi et al. | 180/215 |
| 4,811,810 | 3/1989 | Watanabe | 180/215 |
| 4,856,373 | 8/1989 | Washizawa | 74/710.5 |

FOREIGN PATENT DOCUMENTS

Hei 418593  3/1992  Japan.

*Primary Examiner*—Paul N. Dickson
*Attorney, Agent, or Firm*—Birch, Stewart, Kolasch & Birch, LLP

[57] ABSTRACT

An axle for a vehicle includes an elongated shaft having a first end, a second end and an intermediate portion being disposed therebetween. The elongated shaft includes a predetermined diameter extending over a portion thereof. The first end of the elongated shaft being designed for mounting a first wheel thereon. The second end of the elongated shaft being designed for mounting a second wheel thereon. The intermediate portion includes a flange extending a predetermined distance along the length of the axle, the flange being designed for mounting and positioning a drive gear assembly and a brake drum assembly relative to each other with the flange being disposed therebetween. The flange is provided as an enlarged diameter section having a diameter greater than the predetermined diameter extending over a portion thereof and is displaced to one side relative to a center section of the elongated shaft.

16 Claims, 3 Drawing Sheets

FINAL DRIVE ASSEMBLY FOR AN ALL-TERRAIN VEHICLE

Applicant claims the benefit of U.S. provisional application No. 60/009,307 filed Dec. 28, 1995.

BACKGROUND OF THE INVENTION

1. Field of the Invention

A drive assembly for an all-terrain vehicle (ATV) is provided wherein a flange is formed on an axle for permitting the mounting of a drive gear assembly and a brake drum assembly relative to each other with the flange being disposed therebetween.

2. Description of Background Art

Hithertofore, axle assemblies have been provided for all-terrain vehicles wherein a drive gear assembly is displaced a predetermined distance away from the brake drum assembly. Conventionally, the brake drum assembly is disposed in the area adjacent to one of the wheels of the all-terrain vehicle so as to permit selective braking of the vehicle. The drive gear assembly is normally mounted adjacent to the central portion of the axle to transmit rotation to the wheels to impel the all-terrain vehicle across a path. The mounting of the drive gear assembly at a predetermined distance away from the brake drum assembly requires a connector housing to maintain the predetermined distance therebetween. The connector housing adds extra weight to the vehicle. In addition, it is difficult to service the drive gear assembly and the brake drum assembly due to the complicated arrangement which requires disconnecting the various elements from the connector housing during repairs.

Axle assemblies for conventional all-terrain vehicles require mounting nuts and threaded portions on the axle to permit the mounting of the drive gear assembly and the brake drum assembly relative to the axle. The use of threaded portions on the axle produces stress near the threaded portion. Further, the threaded portions may corrode due to the positioning of the threads on the axle.

SUMMARY AND OBJECTS OF THE INVENTION

The present invention is directed to an axle and an axle assembly for a vehicle wherein a flange is provided along the axle for permitting the mounting of a drive gear assembly and a brake drum assembly relative to each other. The flange permits the drive gear assembly and the brake drum assembly to be mounted adjacent to each other to thus facilitate servicing.

It is an object of the present invention to provide a better seal to prevent dust, dirt, water and/or other foreign matter from entering into the drive gear assembly and the brake drum assembly. In addition, the ground clearance is improved due to the mounting of the drive gear assembly and the brake drum assembly relative to each other. The present invention provides for an axle assembly which is lower in weight, costs less to manufacture and reduces the number of parts needed for construction.

These and other objects of the present invention are achieved by providing an axle for a vehicle which includes an elongated shaft having a first end, second end and an intermediate portion being disposed therebetween. The elongated shaft has a predetermined diameter extending over a portion thereof. The first end of the elongated shaft is adapted for mounting a wheel thereon. The second end of the elongated shaft is adapted for mounting a second wheel thereon. The intermediate portion includes a flange extending a predetermined distance along the length of the axle. The flange is adapted for mounting and positioning a drive gear assembly and a brake drum assembly relative to each other with the flange being disposed therebetween.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
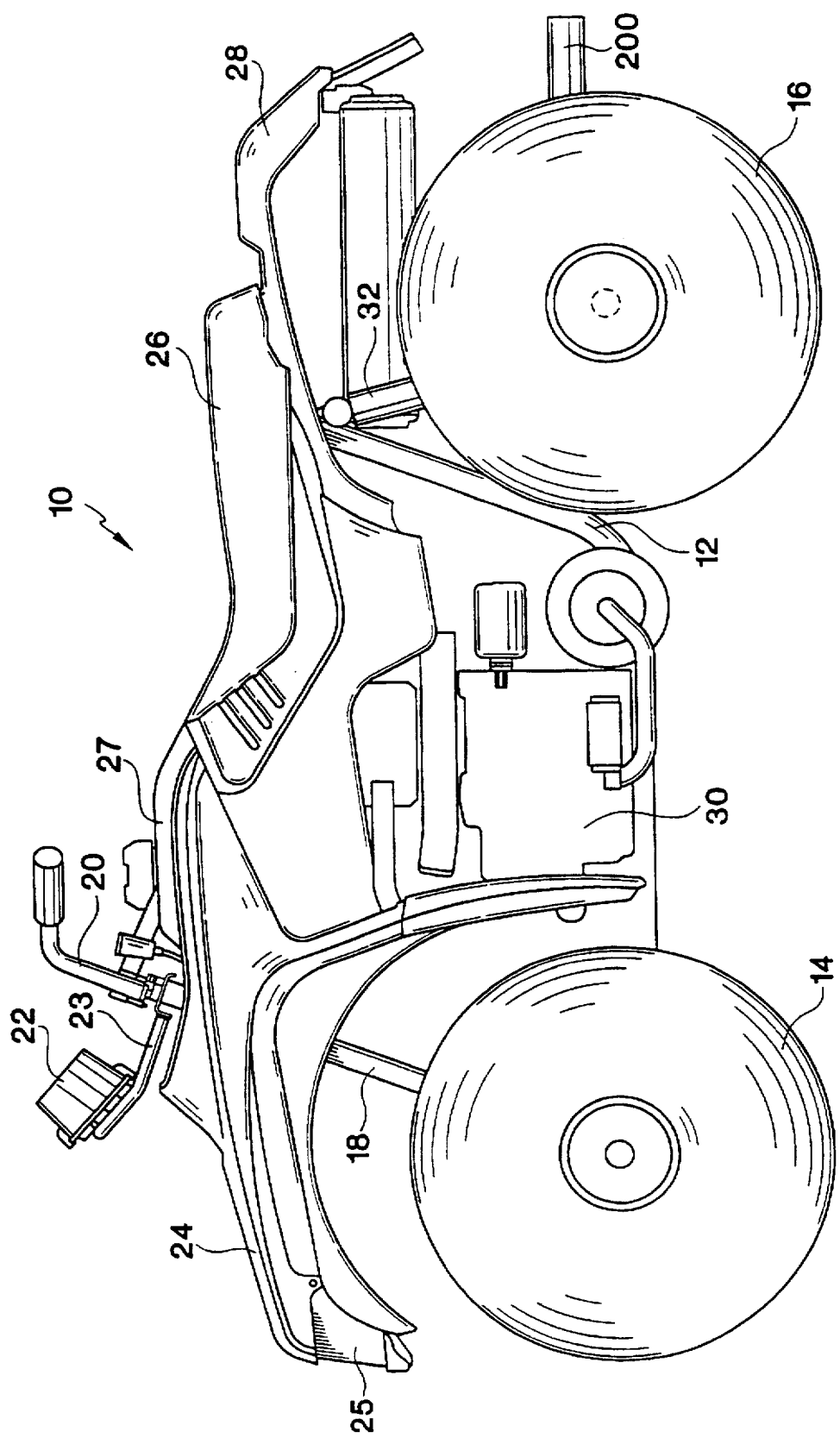
FIG. 1 is a side elevational view illustrating an all-terrain vehicle which incorporates the axle assembly of the present invention.

As illustrated in FIG. 1, a side elevational view discloses an all-terrain vehicle 10 which includes a frame 12. The frame 12 is provided for mounting the front wheel 14 and the rear wheel 16 relative thereto. FIG. 1 is directed to a four wheel all-terrain vehicle. However, the present invention may be used together with a three wheel all-terrain vehicle. A front support assembly 18 is mounted to the frame 12 and is operatively connected to handlebars 20 for imparting steering motion to the front wheels 14 during use. A speedometer/odometer 22 is mounted on a bracket 23 for securing the speedometer/odometer 22 relative to the front support assembly 18. A front fender 24 is provided adjacent to the front of the frame 12. A headlight 25 is mounted in the fender 24 for illumination during use of the all-terrain vehicle 10. A rear fender 28 is mounted on the frame 12 behind a seat 26 and adjacent to the rear wheel 16.

A motor 30 is mounted adjacent to the central portion of the frame 12 for providing operative power to propel the all-terrain vehicle 10 across a ground surface. A shock absorber 32 is mounted to the frame 12 and a rear axle for absorbing some of the shock which occurs during use of the all-terrain vehicle. A gas tank 27 is mounted adjacent to the handlebars 20 for supplying fuel to the motor 30 during use.

Figure 2:
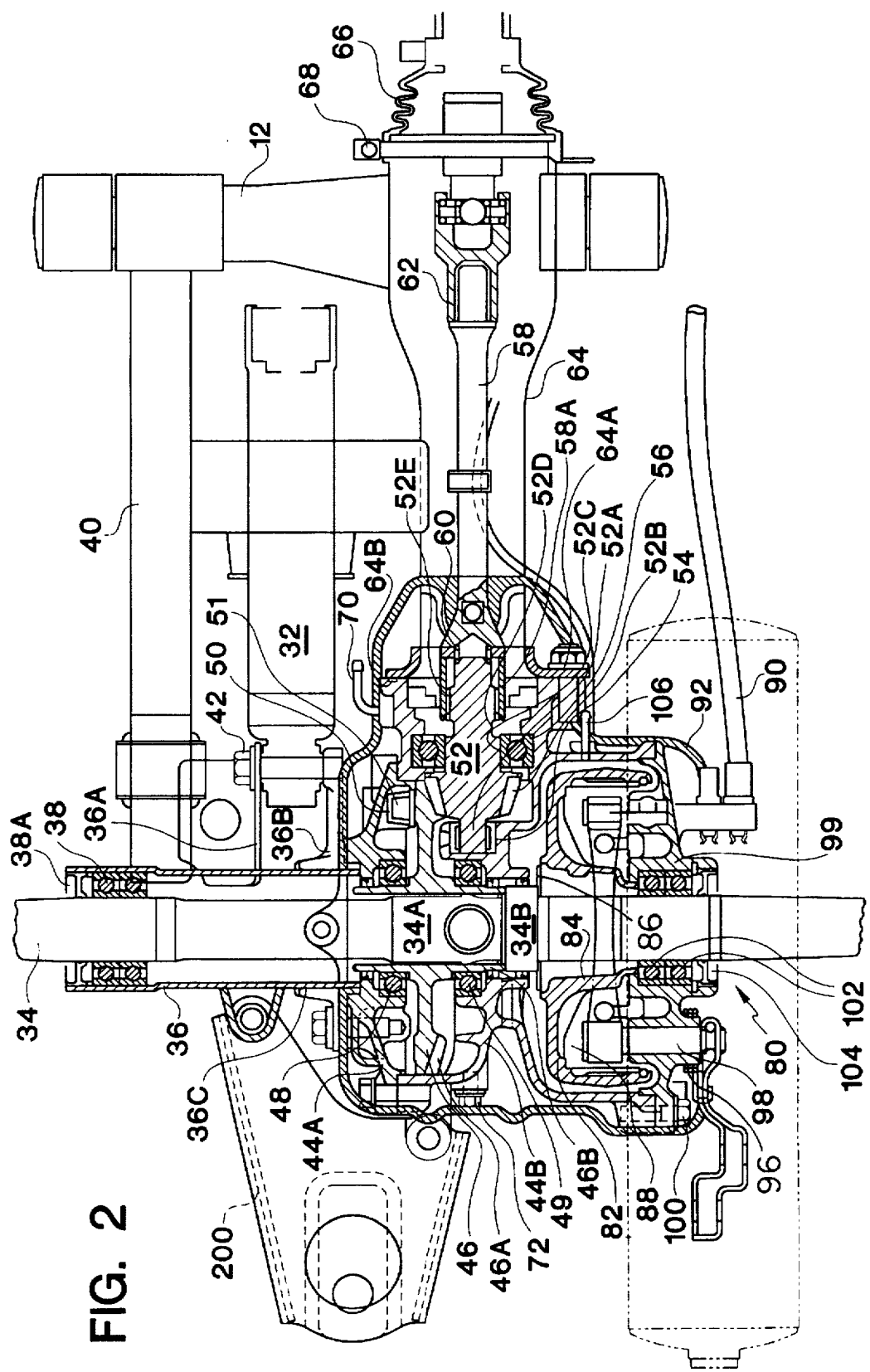
FIG. 2 is a partial cross-sectional view illustrating the axle assembly which includes a flange for mounting the drive gear assembly and the brake drum assembly relative to each other.

As illustrated in FIG. 2, an axle 34 is operatively mounted within a tubular housing 36. Bearings 38 are mounted between the tubular housing 36 and the axle 34 for permitting rotation of the axle 34 relative to the tubular housing 36. A seal 38A is provided adjacent to the bearings 38 for preventing dust, dirt, water or other debris from entering into the bearings 38 and being disposed adjacent to the axle 34.

A swing arm 40 is operatively mounted relative to the tubular housing 36 and to a portion of the frame 12 for retaining the tubular housing 36 and the axle 34 in a predetermined disposition relative to the frame 12. The tubular housing 36 includes extensions 36A, 36B and 36C which extend outwardly therefrom. Tubular housing extensions 36A and 36B are designed for permitting the shock absorber 32 to be secured thereto by means of a bolt 42. The extension 36C is designed for securing the tubular housing 36 relative to a gear case 44A, 44B.

A ring gear 46 includes gear teeth 46A and an orthogonally projecting extension 46B. The orthogonally projecting extension 46B is splined onto the section 34A of the axle 34. The section 34A is of a predetermined diameter and extends a predetermined distance along at least a portion of the orthogonally projecting extension 46B of the ring gear 46. A flange 34B is provided along a portion of the axle 34. The flange 34B is of a predetermined diameter which is larger than the diameter of the section 34A. The orthogonally projecting extension 46B of the ring gear 46 abuts against the flange 34B and is held in accurate alignment relative to the axle 34. Bearings 48, 49 are mounted adjacent to the outwardly extending portions of the orthogonally projecting extension 46B of the ring gear 46 to permit the gear case 44A and 44B to allow the ring gear 46 and the axle 34 to be rotated relative to the gear case 44A, 44B.

The gear case 44A includes an aperture 50 for mounting a shim pin 51 for providing a backing to the ring gear 46. A pinion gear 52 is mounted adjacent to and in meshing engagement with the ring gear 46. The pinion gear 52 includes a projection 52A which extends within a ring stop 54. The ring stop 54 is formed in the gear case 44B. The pinion gear 52 includes the gear teeth 52B which mesh with the gear teeth 46A on the ring gear 46. A reduced diameter portion 52C is provided adjacent to the central portion of the pinion gear 52. A bearing 56 is mounted on the reduced diameter portion 52C to permit rotation of the pinion gear 52 relative to the gear case 46B. The pinion gear 52 includes a further reduced section 52D and a spline section 52E. The spline section 52E is designed to engage the projection 58A of the drive shaft 58 to provide rotary motion to the pinion gear 52. A spring 60 is provided between the drive shaft 58 and the pinion gear 52 so as to provide a predetermined force on the pinion gear 52 towards the ring stop 54 and the gear case 46B. In this manner, the teeth 52B of the pinion gear 52 are held in engagement with the teeth 46A of the ring gear 46.

The drive shaft 58 is coupled to a differential gear 62 which is operatively connected to the motor 30 of the all-terrain vehicle 10.

A tubular housing 64 is mounted onto the gear case 44B by means of a bolt 64A and an indexing pin 64B. A rubber fitting 66 is secured to the housing 64 by means of a clamp 68. The housing 64, the rubber fitting 66 and the gear case 44A, 44B maintain a clean environment for the drive shaft 58, the pinion gear 52 and the ring gear 46 so as to permit rotary motion to be transmitted from the drive shaft 58 to the pinion gear 52 and the ring gear 46 to thereafter impart rotary motion to the axle 34.

A gear case breather 70 is provided for communicating with the interior of the gear case housing 44A, 44B. In addition, an oil check bolt 72 is provided on the gear case housing 44B for checking the oil disposed within the gear case housing 44B.

A brake assembly 80 is provided along the axle 34 adjacent to the gear case 44A, 44B. The brake assembly 80 includes a brake housing 82 which includes an outwardly projecting portion 84 which is splined onto the axle 34 for rotation therewith. A dish spring 86 is provided adjacent to the flange 34B and the brake housing 82. The brake housing 82 including the outwardly projecting portion 84 splined onto the axle 34 is of a predetermined diameter so as to engage the flange 34B with the dish spring 86 being disposed therebetween. A brake drum 88 is mounted within the brake housing 82 for selectively applying a force to the brake housing 82. A foot brake cable 90 is provided for transmitting a force from the foot pedal of the all-terrain vehicle 10 to the brake drum 88. A hand brake cable 92 is provided to extend upwardly towards the handlebars 20 for transmitting a force from a hand brake and through the hand brake cable 92 to actuate the brake drum 88 relative to the housing 82.

A spring 96 is provided adjacent to the stem 98 for deactuating the brake drum 88 from the brake housing 82 after a force, applied by either the foot brake cable 90 or the hand brake cable 92, is released. The spring 96 will disengage the brake drum 88 from the housing 82 to permit the axle 34 to continue to rotate. When the foot brake cable 90 or the hand brake cable 92 applies a force, the brake drum 88 will actually engage together with the brake housing 82 to stop rotary motion from being transmitted to the axle 34. A brake drum housing 99 is mounted on the gear case 44B by means of a bolt 100. Bearings 102 are provided adjacent to the brake housing 99 for permitting rotation of the axle 34 relative to the brake housing 99. A seal 104 is mounted around the axle 34 adjacent to the bearings 102 to prevent dust, dirt, water or other debris from entering into the gear case 44B.

A breather 106 for the brake assembly is provided. The breather 106 for the brake assembly is fully sealed to prevent dust, dirt, water or other debris from entering into the brake housing.

Figure 3:
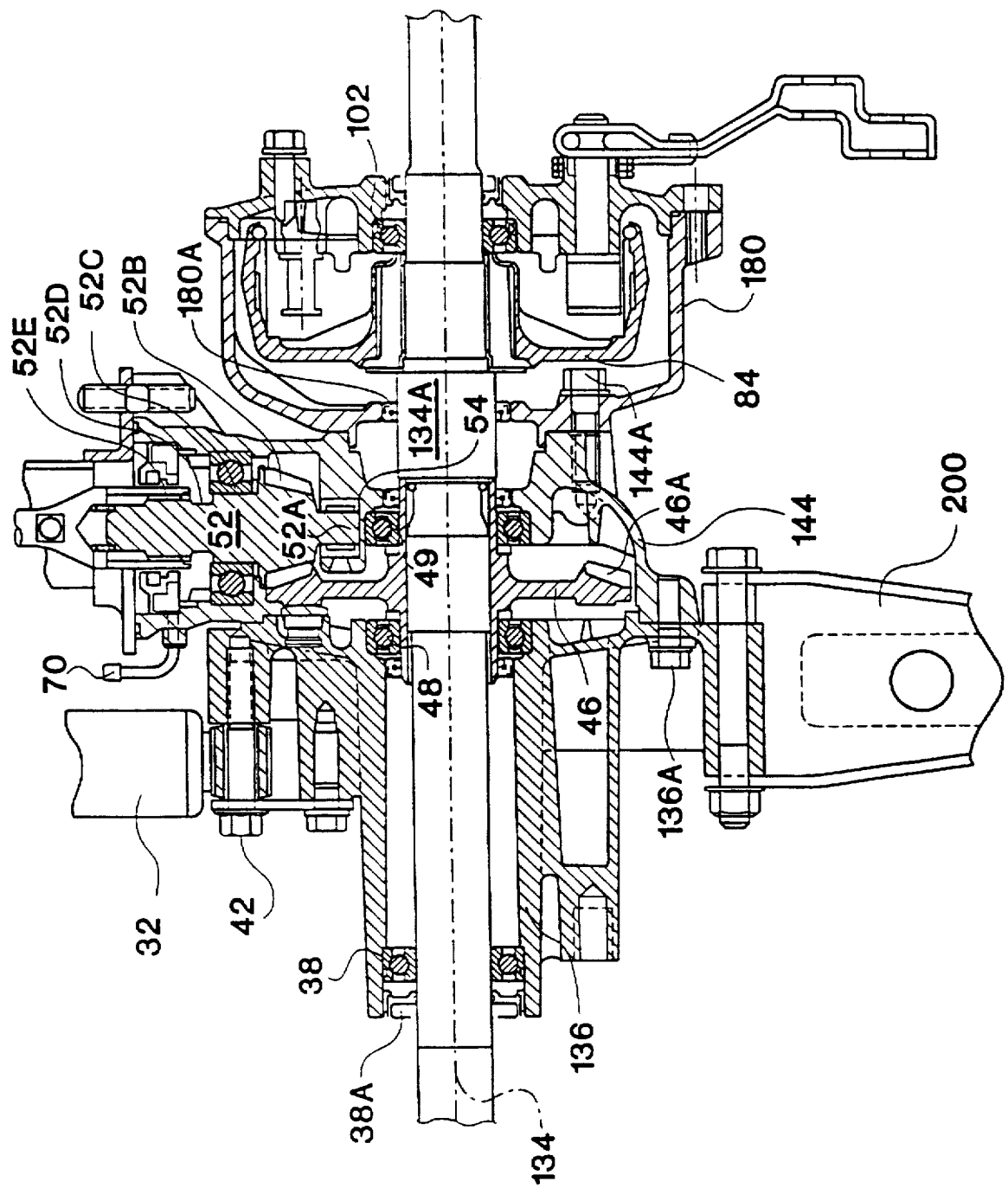
FIG. 3 is a partial cross-sectional view illustrating a second embodiment wherein a housing is provided for mounting the drive gear assembly and the brake drum assembly relative to each other with the flange being disposed therebetween.

FIG. 3 illustrates another embodiment of the present invention wherein separate covers are provided for the drive gear assembly and the brake drum assembly. Like parts illustrated in FIG. 2 are represented by the same numerals. A tubular housing 136 is provided which extends along the axle 134. A gear case housing 144 is secured to the tubular housing 136 by means of a bolt 136A. A separate brake assembly housing 180 is secured to the gear case housing 144 by means of a bolt 144A. A seal 180A is mounted between the interior portion of the brake drum assembly housing 180 and the axle 134 to prevent material from the gear case 144 from entering into the brake drum assembly housing 180. In addition, material from the brake drum assembly housing 180 is prohibited from entering into the gear case housing 144.

As illustrated in FIGS. 2 and 3, a trailer hitch 200 is secured to the tubular housing 36 and gear case 44A or the tubular housing 136 and the gear case 144 to permit a trailer to be connected to the all-terrain vehicle 10.

The present invention provides a single flange 34A, 134A for permitting the mounting of a drive gear assembly and a brake drum assembly relative to each other with the flange being disposed therebetween. This arrangement enables the construction of the drive gear assembly and the brake drum assembly to be in close proximity to each other, thus, reducing the need for a connector member to be disposed therebetween. No mounting nuts or threaded portions on the axle are required in order to mount the drive gear assembly and the brake drum assembly relative to each other. Better seals can be provided to prevent dust, dirt, water or other debris from entering into the various components of the drive assembly and the brake assembly. In view of the fact that no threads are provided on the axle, no corrosion occurs with the assembly according to the present invention. The drive gear assembly and the brake drum assembly are constructed to be of a lower weight than a conventional axle assembly due to the fact that no connecting parts are required. The cost of construction and the number of parts are reduced. In addition, better ground clearance is provided due to the mounting of the drive gear assembly and brake drum assembly in close proximity to each other. The drive shaft of the all-terrain vehicle 10 is shifted to be on the right side of the vehicle or the left side of the vehicle to permit the construction of the drive gear assembly and the brake drum assembly relative to each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An axle for a vehicle comprising:

an elongated shaft having a first end, a second end and an intermediate portion being disposed therebetween, said intermediate portion having a perimeter surface;

said first end of said elongated shaft being adapted for mounting a first wheel thereon;

said second end of said elongated shaft being adapted for mounting a second wheel thereon; and a flange extending a predetermined distance along a length of said intermediate portion, said flange forming a first edge extending out of said perimeter surface of said intermediate portion, said first edge facing said first end of said elongated shaft, said flange also forming a second edge extending out of said perimeter surface of said intermediate portion, said second edge facing said second end of said elongated shaft, said first edge for serving as an abutment against which a drive gear assembly is mounted and said second edge for serving as an abutment against which a brake drum assembly is mounted.

2. The axle for a vehicle according to claim 1, wherein said intermediate portion is displaced to one side relative to a center section of said elongated shaft.

3. The axle for a vehicle according to claim 1, wherein said drive gear assembly includes a ring gear splined to said axle at a position adjacent to said flange.

4. The axle for a vehicle according to claim 1, wherein said brake assembly includes a brake housing splined to said axle at a position adjacent to said flange.

5. The axle for a vehicle according to claim 1, wherein said first edge is formed completely around said perimeter surface of said intermediate portion.

6. The axle for a vehicle according to claim 1, wherein a cross-section of said perimeter surface of said intermediate portion adjacent said flange is circular and has a first diameter, a cross-section of said flange is circular and has a second diameter, said perimeter surface of said intermediate portion and said flange are concentric, and said second diameter is greater than said first diameter.

7. An axle assembly for a vehicle comprising:

an elongated shaft having a first end, a second end and an intermediate portion being disposed therebetween, said intermediate portion having a perimeter surface;

said first end of said elongated shaft being adapted for mounting a first wheel thereon;

said second end of said elongated shaft being adapted for mounting a second wheel thereon;

a drive gear assembly being operatively mounted relative to said elongated shaft for transmitting rotary motion thereto;

a brake drum assembly being operatively mounted relative to said elongated shaft for selectively applying a braking force thereto; and a flange extending a predetermined distance along a length of said intermediate portion, said flange forming a first edge extending out of said perimeter surface of said intermediate portion, said first edge facing said first end of said elongated shaft, said flange also forming a second edge extending out of said perimeter surface of said intermediate portion, said second edge facing said second end of said elongated shaft, said first edge abutting against said drive gear assembly and said second edge abutting against said brake drum assembly.

8. The axle assembly for a vehicle according to claim 6, wherein said intermediate portion is displaced to one side relative to a center section of said elongated shaft.

9. The axle assembly for a vehicle according to claim 6, wherein said drive gear assembly includes a ring gear splined to said axle at a position adjacent to said flange.

10. The axle for a vehicle according to claim 6, wherein said brake assembly includes a brake housing splined to said axle at a position adjacent to said flange.

11. The axle assembly for a vehicle according to claim 6, and further including a gear case and a brake drum housing affixed relative to each other for surrounding said drive gear assembly and said brake drum assembly.

12. The axle assembly for a vehicle according to claim 9, and further including a pinion gear in meshing engagement with said ring gear for transmitting rotary motion thereto.

13. The axle assembly for a vehicle according to claim 9, and further including a shim pin operatively mounted relative to said ring gear for providing a backing for said ring gear.

14. The axle assembly for a vehicle according to claim 11, and further including bearings operatively mounted relative to said gear case, said brake drum housing and said axle for permitting said axle to rotate relative to said gear case and said brake drum housing.

15. The axle assembly for a vehicle according to claim 7, wherein said first edge is formed completely around said perimeter surface of said intermediate portion.

16. The axle assembly for a vehicle according to claim 7, wherein a cross-section of said perimeter surface of said intermediate portion adjacent said flange is circular and has a first diameter, a cross-section of said flange is circular and has a second diameter, said perimeter surface of said intermediate portion and said flange are concentric, and said second diameter is greater than said first diameter.

* * * * *